United States Patent
Dacosta

(10) Patent No.: US 7,565,113 B2
(45) Date of Patent: Jul. 21, 2009

(54) METHOD AND APPARATUS TO RESIST FADING IN MIMO AND SIMO WIRELESS SYSTEMS

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 445 days.

(21) Appl. No.: 11/094,385

(22) Filed: Mar. 29, 2005

(65) Prior Publication Data

US 2006/0223450 A1    Oct. 5, 2006

(51) Int. Cl.
H04B 1/00    (2006.01)
(52) U.S. Cl. .................. 455/65; 455/504; 455/506; 455/522; 455/561; 375/347; 375/219; 324/158
(58) Field of Classification Search .............. 455/39, 455/522, 561, 500, 41.2, 78, 80, 101, 129, 455/65, 504, 506; 375/347, 219, 268; 324/158, 324/73
See application file for complete search history.

(56) References Cited

U.S. PATENT DOCUMENTS

| | | | |
|---|---|---|---|
| 5,838,720 A * | 11/1998 | Morelli | 375/219 |
| 6,205,341 B1 | 3/2001 | Monot et al. | |
| 6,295,324 B1 * | 9/2001 | Whikehart | 375/308 |
| 6,721,550 B1 * | 4/2004 | Okada et al. | 455/277.1 |
| 6,735,418 B1 * | 5/2004 | MacNally et al. | 455/78 |
| 6,850,741 B2 * | 2/2005 | Lei et al. | 455/101 |
| 6,873,825 B2 * | 3/2005 | Pattabiraman | 455/41.2 |
| 6,898,198 B1 * | 5/2005 | Ryan et al. | 370/338 |
| 6,985,544 B2 * | 1/2006 | Matsui et al. | 375/347 |
| 7,171,223 B2 * | 1/2007 | Herscovich et al. | 455/500 |
| 7,194,237 B2 * | 3/2007 | Sugar et al. | 455/39 |
| 2002/0193146 A1 | 12/2002 | Wallace et al. | |
| 2003/0058833 A1 | 3/2003 | Hashem et al. | |
| 2003/0161428 A1 | 8/2003 | Garrett et al. | |
| 2003/0162566 A1 | 8/2003 | Shapira et al. | |
| 2004/0042556 A1 | 3/2004 | Medvedev et al. | |
| 2004/0056785 A1 | 3/2004 | Webster et al. | |
| 2004/0137860 A1 * | 7/2004 | Oh et al. | 455/127.1 |
| 2004/0252632 A1 | 12/2004 | Bourdoux et al. | |
| 2004/0266429 A1 * | 12/2004 | Hui et al. | 455/434 |
| 2005/0002468 A1 | 1/2005 | Walton et al. | |
| 2005/0008092 A1 | 1/2005 | Kadous | |
| 2005/0014464 A1 | 1/2005 | Larsson | |
| 2005/0075081 A1 * | 4/2005 | Catreux-Erceg et al. | 455/78 |
| 2005/0232216 A1 | 10/2005 | Webster et al. | |
| 2006/0034279 A1 * | 2/2006 | Cho et al. | 370/390 |
| 2006/0176974 A1 * | 8/2006 | Smith et al. | 375/267 |
| 2006/0210001 A1 * | 9/2006 | Li et al. | 375/346 |
| 2007/0218845 A1 * | 9/2007 | Efland et al. | 455/84 |

* cited by examiner

*Primary Examiner*—Matthew D Anderson
*Assistant Examiner*—Minh D Dao
(74) *Attorney, Agent, or Firm*—John P. O'Banion

(57) ABSTRACT

In a wireless communication system the receiver includes a first plurality of receive chains and a second plurality of antennas. Each receive chain is selectively connectable to selected antennas. The antennas are selected based on criteria obtained from a received RF signal to produce an antenna configuration connected to the receive chains to reduce RF fading at the receiver. An electronic switch connects the antennas to the receive chains. The receiver is programmed to determine which antenna should be connected to each receive chain by the switch by measuring characteristics of the received signal for each allowed antenna configuration and selecting the best antenna configuration. Transmitters may be similarly configured.

29 Claims, 5 Drawing Sheets

METHOD AND APPARATUS TO RESIST FADING IN MIMO AND SIMO WIRELESS SYSTEMS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to wireless communication, and more particularly to reducing RF fading in wireless communication systems.

2. Description of Related Art

Wireless communications have proliferated in recent years because of their mobility and convenience. The basic feature of wireless communication is transmitting and receiving RF signals through the air, without wires, often between a base station and a mobile station. One particular type of wireless communication system is the wireless local area network (WLAN). WLANs are built according to a number of standards, particularly several 802.11x IEEE standards. Information is typically sent as packets, containing identifying information, the actual information, and error information. The complete message may be contained in a number of different packets.

Whatever type of wireless system is used, a common requirement or goal is high performance. These systems all face performance problems associated with RF propagation. Signal variation due to RF propagation problems will negatively affect system performance.

RF propagation (e.g. RF propagation of signals transmitted from 802.11 WLANs) encounters spatial as well as temporal fading. The causes of fading include constructive and destructive interference of RF due to multipath propagation, as well as the motion of objects in the environment. Such fading can cause the power of an RF signal to vary by several dB over distances of an inch or more, in addition to variation of signal power over time at any single location.

RF fading is a problem for wireless systems based on technologies such as MIMO (Multiple Input, Multiple Output). In such MIMO systems, spatial multiplexing is used to increase the capacity of a single frequency channel. Data is transmitted from two or more antennas simultaneously, and the data on each antenna is different. For example, by using three transmit (Tx) antennas and three receive (Rx) antennas, the spectral efficiency (i.e. capacity) of an 802.11 channel may be increased 3x. However, performance of MIMO systems depends on the nature of the signal received at each of the three Rx antennas from each of the three Tx antennas. Ideally, the paths from each Tx antenna to each Rx antenna are uncorrelated while having sufficient signal to noise ratio (SNR) to allow reliable demultiplexing at the receiver. However it is possible that the signal at one or more of the three antennas at the receiver will have a low SNR (Signal to Noise Ratio) and hence will be unable to support a desired data rate for the MIMO system (e.g. 72 Mbps) even though a few (e.g. three) inches away a signal with adequately high SNR may exist.

RF fading is also a problem for WLANs using coherent combination at the receiver, such as those employing Maximum Ratio Combining (MRC); these can be MIMO or SIMO (Single Input, Multiple Output) systems. In cases where MRC-type processing is used with MIMO, the data is transmitted from the transmitter from two or more antennas simultaneously; however, the data on the Tx antennas is the same sequence, perhaps only offset by a fixed time delay. Here, additional (>1) receivers are used to increase the SNR at the receiver while attempting to avoid fading by spatially separating the receiving antennas.

It is sometimes possible to improve performance of the receiver during fading by simply moving the receiver in its local vicinity. However this is not practical in cases where the receiver is part of a large immovable object, and is also not user-friendly since it is often unclear to even a mobile user exactly how or in which direction the receiver should be moved in order to improve performance.

In order to help mitigate fading for MIMO as well as MRC-type systems, additional Rx paths are usually added. Each additional Rx chain includes not only a dedicated antenna but also dedicated Low Noise Amplifiers, PHY (RF and digital) chips, and other components. The signals from each additional antenna (processing path) are processed at the receiver. By adding these additional processing chains in parallel to those existing previously in the system, the receiver can improve SNR of the received signal while also sampling RF from spatially separated locations, thus decreasing the possibility of fading affecting all the antennas simultaneously. Hence additional antennas can provide spatial, polarization, pattern, and other types of diversity that improve performance in MIMO and MRC-type wireless systems. However, the problem with this approach is that adding additional parallel processing chains is computationally complex, and adds many more components, and is hence more expensive and less compact to implement.

Accordingly it is desirable to provide improved method and apparatus to reduce RF fade in wireless communication systems.

BRIEF SUMMARY OF THE INVENTION

An aspect of the invention is a wireless communication apparatus having a transmitter for transmitting an RF signal and a receiver for receiving the RF signal. The receiver includes a first plurality of receive chains and a second plurality of antennas. Each receive chain is selectively connectable to selected antennas. The antennas are selected based on criteria obtained from a received RF signal to produce an antenna configuration connected to the receive chains to reduce RF fading at the receiver.

The invention applies to wireless local area networks (WLANs), including WLANs designed according to any of the 802.11x standards. The invention applies to wireless systems having a transmitter and receiver that are a Multiple Input Multiple Output (MIMO) system, and also to a receiver which is a Maximum Ratio Combining (MRC) system.

Another aspect of the invention is that the receiver contains an electronic switch connecting the antennas to the receive chains. The receiver is programmed to determine which antenna should be connected to each receive chain by the switch by measuring characteristics of the received signal for each allowed antenna configuration and selecting the best antenna configuration.

A further aspect of the invention is a wireless communication apparatus made up of a transmitter for transmitting an RF signal; a receiver for receiving the RF signal, the receiver including a first plurality of receive chains and a second plurality of antennas; means for selectively connecting each receive chain to selected antennas; and means for selecting the antennas to be connected to each receive chain based on criteria obtained from a received RF signal to produce an antenna configuration connected to the receive chains to reduce RF fading at the receiver.

A still further aspect of the invention is a method for reducing fading in a wireless communication system by providing a receiver having a first plurality of receive chains and a second plurality of antennas, selecting the best antenna to be connected to each chain based on criteria obtained from a received RF signal to produce an antenna configuration connected to the receive chains to reduce RF fading at the receiver, and connecting each receive chain to the selected antennas. The best antenna for each chain is selected by measuring characteristics of the received signal for each allowed antenna configuration and selecting the best antenna configuration.

The invention can also be applied to the transmitter by connecting a plurality of transmit chains through a switch to selected antennas.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
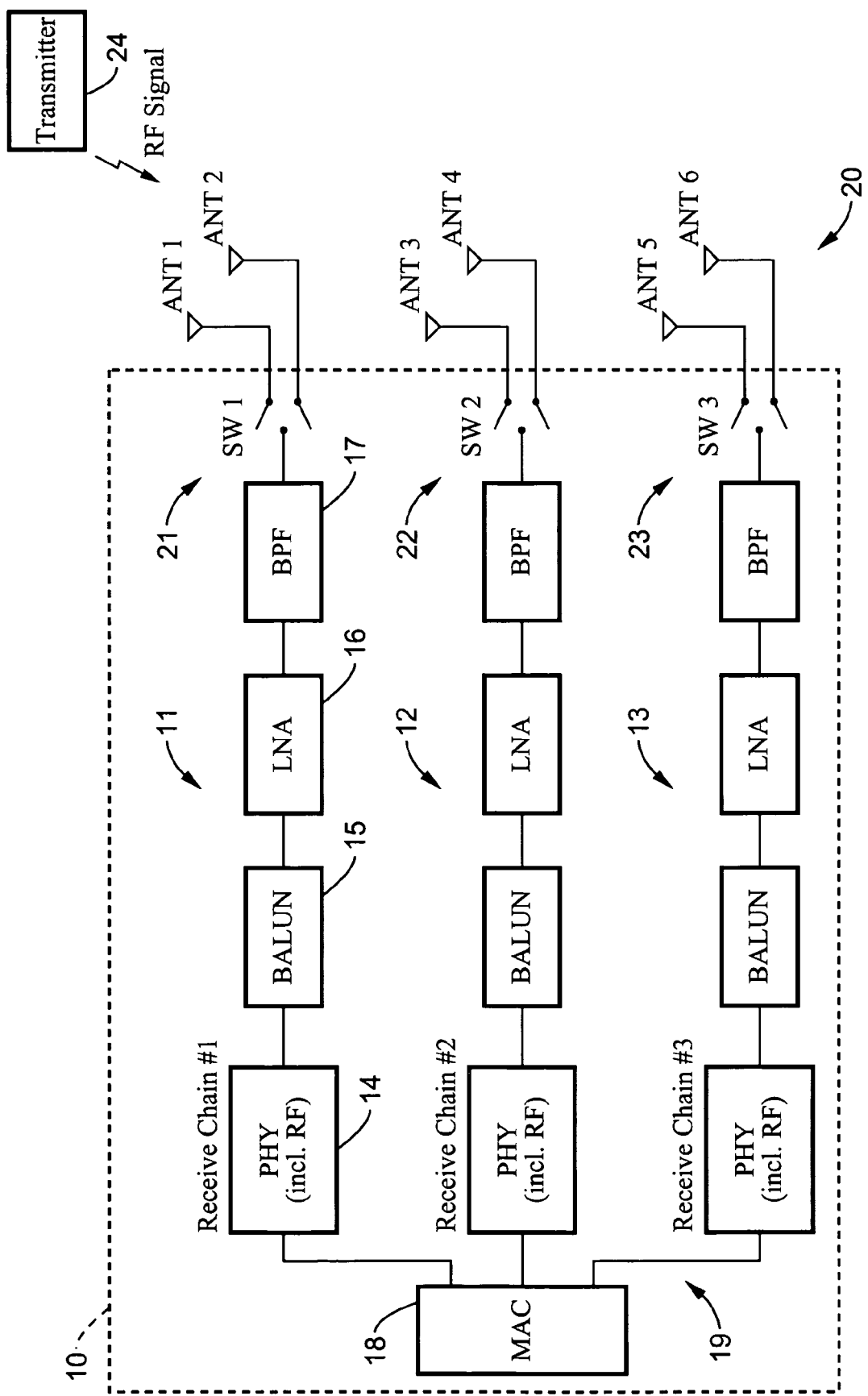
FIG. 1 is a schematic diagram of the RF front end of a wireless system receiver including one embodiment of the antenna switching of the invention.

Referring more specifically to the drawings, for illustrative purposes the present invention is embodied in the apparatus and methods generally shown in FIG. 1 through FIG. 5. It will be appreciated that the apparatus may vary as to configuration and as to details of the parts, and that the methods may vary as to the specific steps and sequence, without departing from the basic concepts as disclosed herein.

The invention applies to systems for the wireless RF propagation of signals, including particularly RF propagation of signals transmitted from 802.11 wireless local area networks (WLANs). The basic structures and operation of these types of systems is well known in the art. The systems include transmitters and receivers, or in combination transceivers, with associated antennas. The systems operate generally on various modulation and demodulation schemes. Information is typically transmitted in packets.

The transmitters and receivers of a wireless system can be configured in various ways to establish communication paths. The four types are Single Input Single Output, SISO; Single Input Multiple Output, SIMO; Multiple Input Single Output, MISO; and Multiple Input multiple Output, MIMO; depending on whether there is one or more antenna on the transmitter and receiver. The more antennas on both the transmitter and receiver, the more paths exist.

Maximal Ratio Combining (MRC) is a technique by which weights are applied to each received signal. The system includes multiple gain amplifiers, each coupled to a receive antenna of the receiver antenna array. Each received signal is weighed proportionally to the signal to noise ratio (SNR) value of the signal. The weighed values are then summed.

The invention is directed to the reduction of spatial as well as temporal fading in these wireless RF systems. Fading can result from constructive and destructive interference of RF due to multipath propagation, as well as the motion of objects in the environment. Such fading can cause the power of an RF signal to vary significantly over short distances, or over time at a single location. Thus the signal received by a user can vary significantly as the user moves or even if stationary. These signal variations can degrade system performance.

Wireless systems to which the invention applies include, but are not limited to, systems based on technologies such as MIMO (Multiple Input, Multiple Output). In such MIMO systems, spatial multiplexing is used to increase the capacity of a single channel. Different data is transmitted from multiple antennas simultaneously. For example, a system with Nt Tx antennas and Nr Rx antennas, where Nt>1 and Nr>1, can be used to increase the spectral efficiency (i.e. capacity) of an 802.11 channel. However, performance of the MIMO systems depends on the signal received at each of the Nr Rx antennas from each of the Nt Tx antennas. Ideally, the paths from each Tx antenna to each Rx antenna are uncorrelated while having sufficient SNR to allow reliable demultiplexing at the receiver. However it is possible that one or more of the Nr antennas at the receiver will be in a low SNR area unable to provide a sufficient data rate (e.g. 72 Mbps), whereas very close by an adequate SNR does exist for the same antennas to receive a suitable signal.

RF fading is also a problem for WLANs using coherent combination at the receiver, such as those employing Maximum Ratio Combining (MRC). MRC systems can be MIMO or SIMO systems. Where MRC-type processing is used with MIMO, the data is transmitted from the transmitter from multiple antennas simultaneously, however the data on all Tx antennas is the same sequence, perhaps only offset by a fixed time delay. Additional receivers are used to increase the SNR at the receiver while attempting to avoid fading by spatially separating the receiving antennas.

In the present invention, MIMO as well as MRC-type systems employ two stages, the first stage being an antenna selection stage, and the second stage being the actual signal processing stage. The following example is based on a wireless receiver but can similarly be applied to a wireless transmitter. In general, there is an electronic switch between a single receive chain and one or more antennas, and this electronic switch can connect the receive chain to at most one of the antennas at any time. For a MIMO or MRC-type system with three Rx chains, there is an electronic switch between each Rx chain and one or more antennas. At least one Rx chain has a switch between itself and more than 1 antenna. Hence a three Rx chain system would have four or more antennas.

FIG. 1 shows the details of the RF front end of a receiver 10 having three receive (Rx) chains (#1, #2, #3) 11, 12, 13. Each Rx chain 11, 12, 13 is formed of a PHY chip 14 (which includes RF circuitry), a Balun circuit (impedance matching transformer) 15, a low noise amplifier (LNA) 16, and a bandpass filter (BPF) 17, connected in series. The PHY chips 14 from each Rx chain are connected to a Medium Access Control (MAC) chip 18. The MAC chip 18 and the PHY chips 14 together form the wireless chipset (PHY/MAC) 19 of the receiver. These individual components are well known in the art. Receiver 10 receives RF signals from a transmitter 24. Several of these components may be physically integrated into single components/packages; what is shown is an example of functions performed.

Each BPF 17 of the Rx chains 11, 12, 13 is connected to a respective electronic switch (SW1, SW2, SW3) 21, 22, 23, each of which is connected to a pair of spatially separated antennas (ANT) 20. SW1 is connected to ANT1 and ANT2; SW2 to ANT3 and ANT4; SW3 to ANT5 and ANT6. The switches 21, 22, 23 are controlled by the wireless chipset 19. Switches 21, 22, 23 allow either of the associated antennas 20 to be connected to Rx chain 11, 12, 13 respectively. In operation, the connected antennas 20 receive an RF signal which then passes through respective Rx chain 11, 12, 13, to the wireless chipset 19 to be processed. The receiver 10 chooses the best combination of antennas 20 to provide the best received signal.

In the illustrative embodiment of FIG. 1, each Rx chain can potentially connect to two antennas, producing a six antenna system. Each of the two Rx antennas for each chain is connected to an electronic switch that is controllable by the wireless chipset (PHY/MAC). Using this switch the receiver chipset determines which of the two possible antennas should be used to receive data for each receive chain (and which 1 or more antennas should be used during transmission from this device. The same device can (and normally would) also be used as the transmitter; however, the device would not transmit and receive at the same time.

Figure 2:
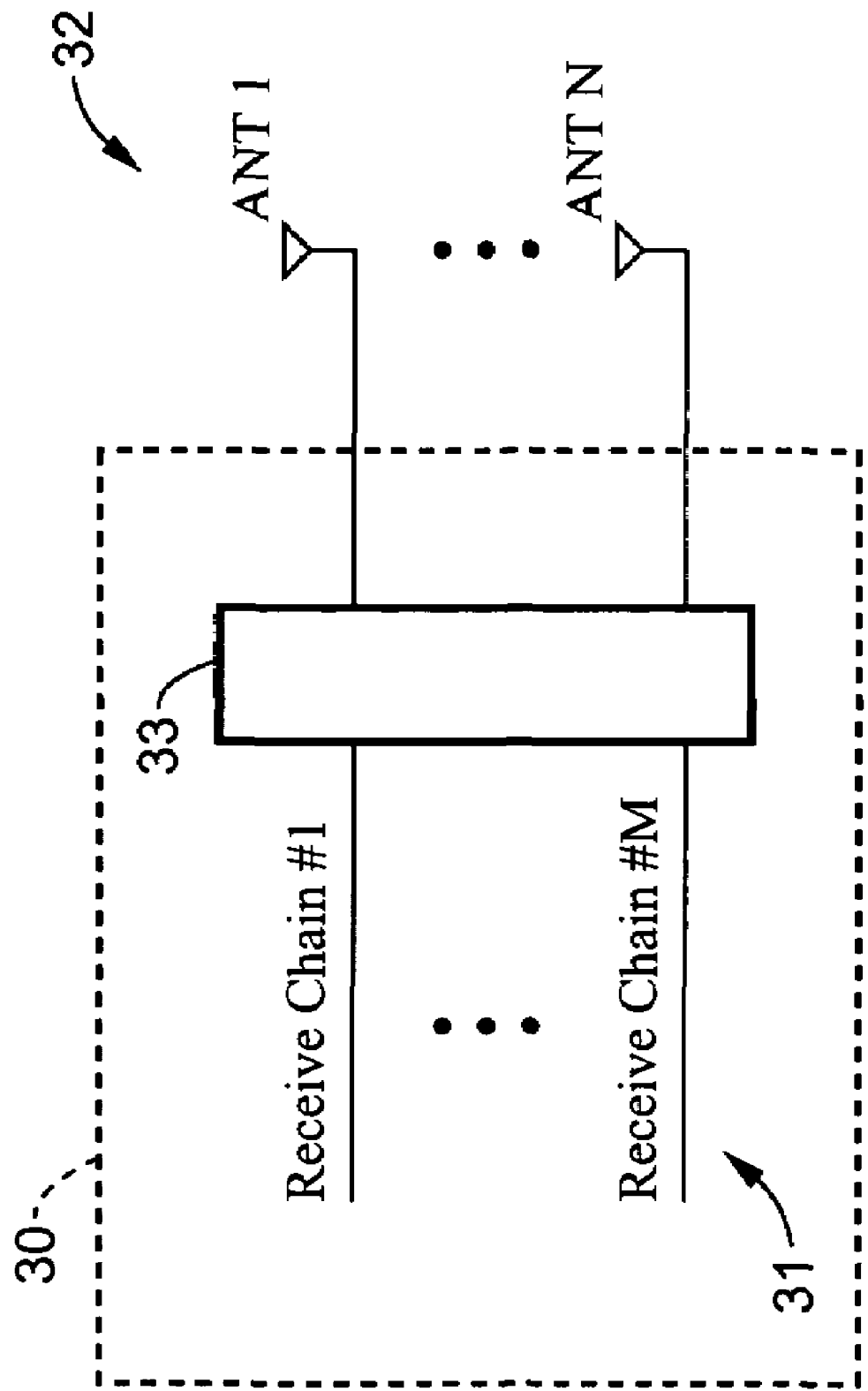
FIG. 2 shows an alternate embodiment of the antenna switching of the invention.

Alternative switching arrangements to the simple two switch per receive chain embodiment of FIG. 1 may also be used. FIG. 2 shows a receiver 30 having a plurality of receive chains (#1 . . . #M) 31 connected to a plurality of spatially separated antennas (ANT1 . . . ANTN) 32 through a more complex switch 33. Switch 33 allows any of the antennas 32 to be connected to any of the receive chains 31. The details of receiver 30 are similar to receiver 10 and are not repeated. In general, the invention may be implemented with any switch arrangement to connect any desired number of antennas to any number of receiver chains.

Hence, the ability of the system to avoid RF fading is now improved, while avoiding a major increase in receiver complexity/cost. In the example of FIG. 1, instead of having to increase the number of LNAs and PHYs, as well as PHY and MAC complexity to support six simultaneous receive chains, all that is needed is three relatively low-cost switches. The rest of the system remains as the original three chain system but the invention has made it effectively into a six chain system from which various three chain systems can be selected by merely adding three switches and three extra antennas.

The question now is how to determine which of the two antennas connected to each Rx chain should be selected during reception of a packet. Note that each antenna is spatially separated, providing spatial diversity which is important for both MIMO performance as well as for decreasing the effects of fading. In addition, each antenna may have other forms of diversity to improve total system performance; such diversities include polarization diversity and pattern diversity. The following methods are used to select and switch between the antennas connected to each switch.

Figure 3:
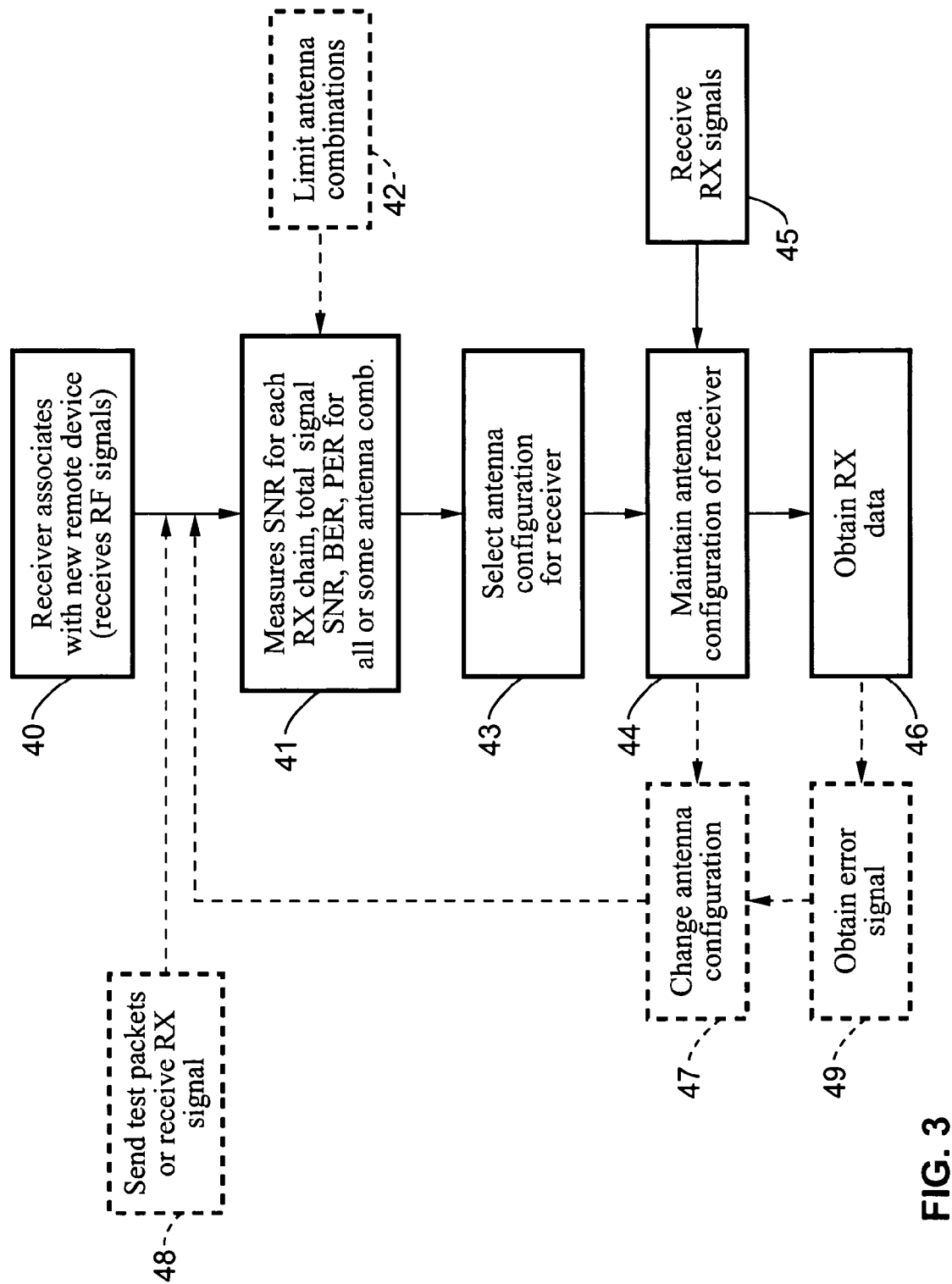
FIG. 3 is a flowchart of the method of selecting the antennas in the receiver chains according to the invention.

FIG. 3 is a flowchart illustrating a method of the invention for selecting the antennas with which to receive incoming signals. The method is implemented in the apparatus of the invention in chipset 19 of receiver 10 of FIG. 1, e.g. in the PHY and MAC components of an 802.11 (or other wireless) solution. The basic functionality for measuring and calculating the metrics needed for implementation of this invention are well known in the art and are in fact implemented by most 802.11 chipset vendors. What is not implemented is the multiple antenna implementation explained here, the required switches, and the higher level logic for selecting antennas based on the measured and calculated metrics.

When the receiver first associates with (i.e. receives an RF signal from) a new remote device, as shown in step 40 of FIG. 3, it measures certain characteristics or parameters of the signal. Preferably, in accordance with the invention, it measures the signal quality (i.e. signal to noise ratio (SNR)) of each of its Rx chains (for packets transmitted from the remote device), as well as the total signal quality (SNR) (where total SNR=SNR of the final signal after any post-processing as occurs with MRC), unencoded bit error rate (BER), and/or packet error rate (PER), for the entire received packet, for each (or some) combination of antennas on each Rx chain, as shown in step 41. In this regard, all of these metrics would preferably be used; however, if one or more of these metrics is not available, the system can function with the others) In the present illustrative case where there are three Rx chains each connected to only two antennas, there are a maximum of eight possibilities. However it is possible to have many more possibilities. For example, in an optional configuration where the six antennas are all connected to each of three different switches, there are one-hundred and twenty possibilities. In this case, a-priori knowledge may be used to probe only certain combinations of antennas, as shown in step 42. The best antenna configuration is then selected based on this information or "selection criteria" obtained from the received signal, as shown in step 43.

Once the optimal antenna combination is selected based on SNR on the antenna as well as bit error rate of the raw data prior to Reed-Solomon (RS) decoding, (and/or final packet error rate), this antenna selection is maintained for all receptions from the remote transmitter. This is an acceptable solution when the receiver receives data from only a single transmitter, such as a video client might in an A/V home network. This is illustrated by steps 44, 45 and 46. The receiver is kept in a selected configuration, step 44, while it receives incoming RF signals, step 45, and processes these signals to obtain the transmitted information, step 46.

If the receiver is to support more than one transmitter, then there are several options, depending on the requirements of the system. In a first option, the antennas to be used for reception are simply fixed to what is considered a-priori to be the best overall configuration for the physical orientation of the receiving device, the location of antennas on this device, and the environment in which the system is to be used. In a second option, the receive antennas are selected so as to optimize packet reception from the transmitter from which the most recent packet was received. In a third option, the antenna configuration is changed based on the expected time sequence of received information. For example, if the first packet is from receiver #1, and a burst of fifty packets are expected from receiver #1, then the antenna selection is maintained optimally for receiver #1 until fifty packets have been received. There are additional options possible.

In addition or alternatively to the above method to learn the combination of antennas to be used for Rx, the receiver can periodically change the combination of Rx antennas in order to determine whether a better combination of Rx antennas is now available, as indicated by step 47. This may be done while actual data is received from the transmitter, or during the reception of packet transmissions initiated exclusively for this purpose, as indicated by step 48. In addition, such probing of new combinations may be initiated when packet reception fails (one or more times, depending on a threshold value) for a certain combination of Rx antennas, which may be caused by temporal fading, such as due to motion of objects in the environment. Obtaining an error signal from the receiver to initiate change of antenna configuration is shown by step 49.

Figure 4:
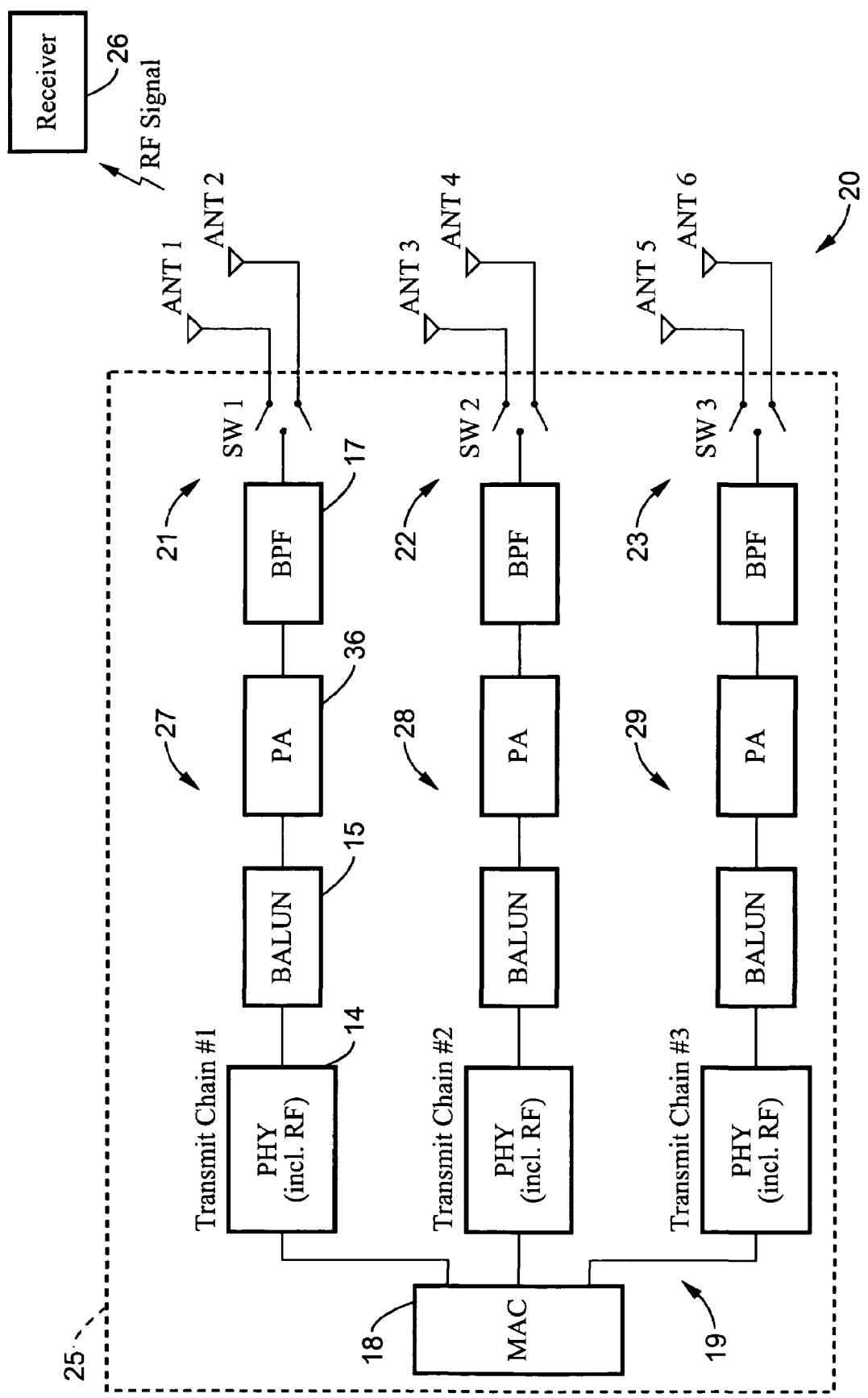
FIG. 4 is a schematic diagram of the RF front end of a wireless system transmitter including one embodiment of the antenna switching of the invention.
Figure 5:
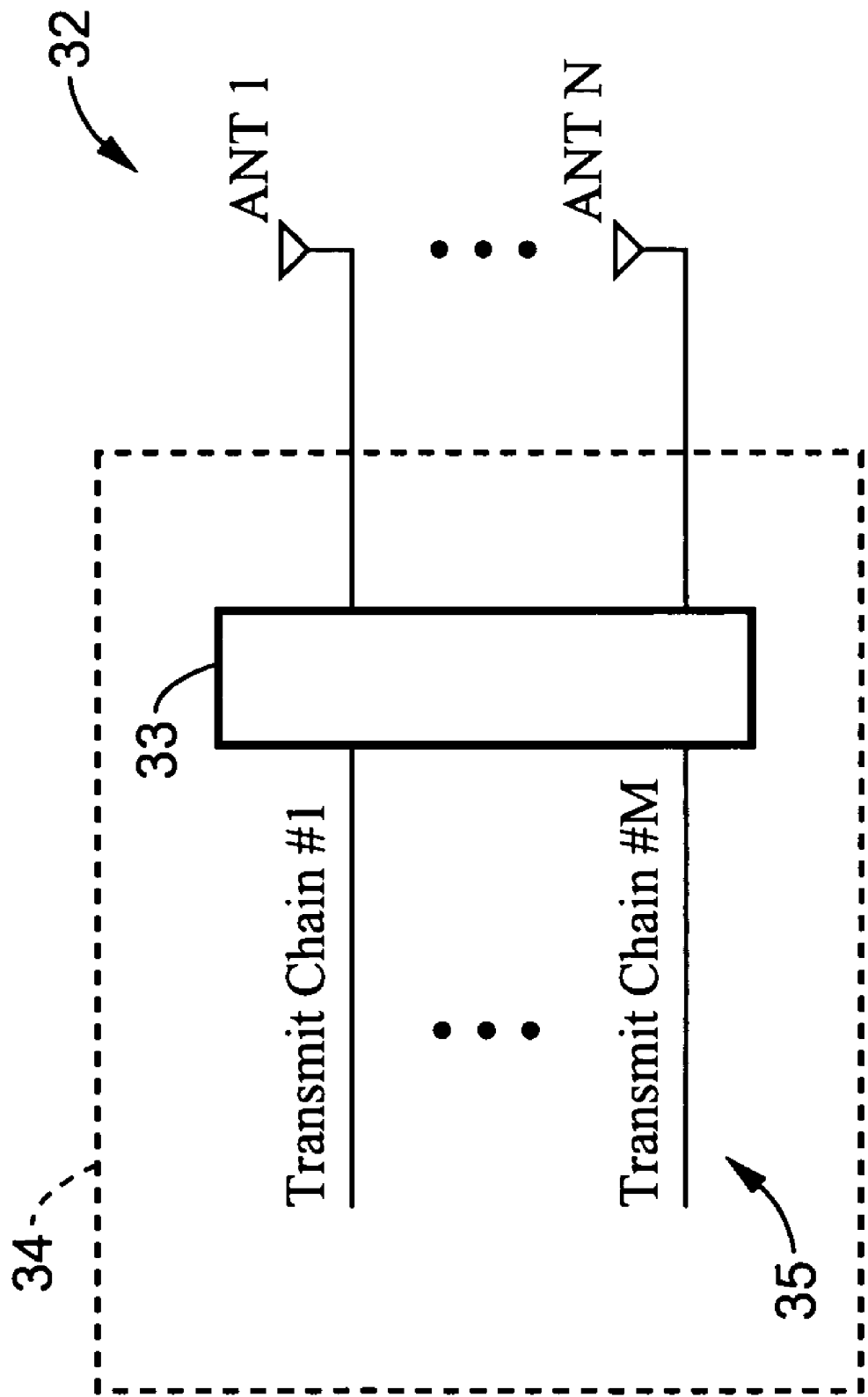
FIG. 5 shows an alternate embodiment of the antenna switching of the invention for a transmitter.

While reception is described above, similar methods are used to learn and select the combination of antennas to use for transmission. as shown in FIG. 4 and FIG. 5, the schematic diagrams are basically the same for Tx and Rx, except the "Rx chain" is replaced by a "Tx chain", and the LNAs are replaced by Power Amplifiers (PAs). In FIG. 4, transmitter 25 is made up of three transmit chains 27, 28, 29, which are similar to receive chains 11, 12, 13 of FIG. 1, except that the LNA 16 in each chain is replaced by PA 36. The rest of the components are similar to the components in FIG. 1 and have the same reference numerals. TX 25 sends RF signals to a Receiver 26. FIG. 5 shows a transmitter 34 with a plurality (1 . . . M) of transmit chains 35 connected through a more complex switch 33 to antennas 32, as in FIG. 2.

While the example above has considered a three chain and two antenna-per-chain system, other configurations may be used. More than two antenna candidates per chain may be used. FIG. 2 illustrates a more complex switching arrangement.

Different wireless technologies may be supported (e.g. 802.11x, 802.16, etc). The invention applies generally to the fading problem in any wireless system.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless communication apparatus, comprising:
   one or more transmitters for transmitting an RF signal;
   a receiver for receiving the RF signal;
   at least one of the receiver and transmitter including a first plurality of chains and a second plurality of antennas;
   an antenna selection stage between the plurality of chains and the plurality of antennas for selectively connecting to a selected combination of antennas;
   wherein the selected combination of antennas are selected based on criteria obtained from a received RF signal to produce an antenna configuration connected to the chains to reduce RF fading at the receiver;
   wherein the selected combination of antennas is changed based on an expected time sequence of received information in the RF signal.

2. An apparatus as recited in claim 1, wherein the wireless communication apparatus comprises a wireless local area network (WLAN).

3. An apparatus as recited in claim 2, wherein the WLAN comprises a WLAN designed according to any of the 802.11x standards.

4. An apparatus as recited in claim 1, wherein the transmitter and receiver comprises a Multiple Input Multiple Output (MIMO) system.

5. An apparatus as recited in claim 1, wherein the receiver comprises a Maximum Ratio Combining (MRC) system.

6. An apparatus as recited in claim 1:
   wherein the receiver includes a first plurality of receive chains and a second plurality of antennas;
   each receive chain being selectively connectable to selected antennas.

7. An apparatus as recited in claim 6:
   wherein the receiver includes a Medium Access Control (MAC) chip; and
   wherein all of the receive chains are connected to the MAC chip.

8. An apparatus as recited in claim 7, wherein each receiver chain comprises in series a PHY chip, a Balun circuit, a low noise amplifier (LNA), and a bandpass filter (BPF), the PHY chip being connected to the MAC chip, the BPF being connected to an antenna.

9. An apparatus as recited in claim 8, further comprising one or more electronic switches between the BPFs and the antennas, the one or more switches being controlled by the MAC chip.

10. An apparatus as recited in claim 6, further comprising an electronic switch positioned between the receive chains and the antennas.

11. An apparatus as recited in claim 10:
    wherein the switch comprises a single switch to which all the chains and all the antennas are connected; and
    wherein any chain can be connected to any antenna.

12. An apparatus as recited in claim 10, wherein the switch comprises a plurality of individual switches, each chain being connected to an associated single switch, and each switch being connected to certain antennas, each individual switch allowing its associated chain to be connected to any antenna connected to that switch.

13. An apparatus as recited in claim 10, wherein the receiver is programmed to determine which antenna should be connected to each receive chain by the switch by measuring characteristics of the received signal for each allowed antenna configuration and selecting the best antenna configuration.

14. An apparatus as recited in claim 13, wherein the receiver measures signal quality for each chain, total signal quality, bit error rate, and packet error rate.

15. An apparatus as recited in claim 1, wherein the transmitter includes a first plurality of transmit chains and a second plurality of antennas, each transmit chain being selectively connectable to selected antennas.

16. An apparatus as recited in claim 15, further comprising one or more electronic switches between the transmit chains and the antennas.

17. An apparatus as recited in claim 16:
wherein the one or more switches comprises a single switch to which all the chains and all the antennas are connected; and
wherein any chain can be connected to any antenna.

18. An apparatus as recited in claim 16, wherein the one or more switches comprises a plurality of individual switches, each chain being connected to an associated single switch, and each switch being connected to certain antennas, each individual switch allowing its associated chain to be connected to any antenna connected to that switch.

19. A wireless communication apparatus, comprising:
a transmitter for transmitting an RF signal;
a receiver for receiving the RF signal;
the receiver including a first plurality of receive chains and a second plurality of antennas, or the transmitter including a third plurality of transmit chains and a fourth plurality of antennas, or both;
means for selectively connecting the plurality of chains to selected combinations of antennas; and
means for selecting the combinations of antennas to be connected to the plurality of chains based on selection criteria obtained from a received RF signal to produce an antenna configuration connected to the chains to reduce RF fading at the receiver;
wherein the means for selecting the combinations of antennas is changed based on an expected time sequence of received information in the RF signal.

20. An apparatus as recited in claim 19, wherein the means for selectively connecting each receive or transmit chain to selected antennas comprises an electronic switch positioned between the receive or transmit chains and the antennas.

21. An apparatus as recited in claim 19, wherein the switch comprises a single switch to which all the receive or transmit chains and all the antennas are connected, and which allows any chain to be connected to any antenna.

22. An apparatus as recited in claim 19, wherein the switch comprises a plurality of individual switches, each chain being connected to an associated single switch, and each switch being connected to certain antennas, each individual switch allowing its associated chain to be connected to any antenna connected to that switch.

23. An apparatus as recited in claim 19, wherein the means for selecting the antennas to be connected to each chain comprises a control unit that is programmed to determine which antenna should be connected to each chain by the switch by measuring characteristics of the received signal for each allowed antenna configuration and selecting the best antenna configuration.

24. An apparatus as recited in claim 23, wherein the receiver measures signal quality for each chain, total signal quality, bit error rate, and packet error rate.

25. A receiver for receiving RF signals from a transmitter in a wireless communication system, comprising:
a first plurality of receive chains;
a second plurality of antennas;
each receive chain being selectively connectable to selected antennas;
the antennas being selected based on criteria obtained from measuring a received RF signal for various antenna configurations to produce an antenna configuration connected to the receive chains to reduce RF fading at the receiver;
wherein said receiver is configured for selecting the combinations of antennas, and changing those selections, in response to an expected time sequence of received information in the RF signal.

26. A receiver as recited in claim 25, further comprising an electronic switch positioned between the receive chains and the antennas.

27. A method for reducing fading in a wireless communication system, comprising:
providing a receiver having a first plurality of receive chains and a second plurality of antennas, or a transmitter having a third plurality of transmit chains and a fourth plurality of antennas, or both;
selecting a combination of the best antennas to be connected to each plurality of chains based on 1) criteria obtained from a received RF signal to produce an antenna configuration connected to the chains to reduce RF fading at the receive; and 2) an expected time sequence of received information in the received RF signal; and
connecting each plurality of chains to the selected combination of the best antennas.

28. A method as recited in claim 27, wherein the best antenna for each chain is selected by measuring characteristics of the received signal for each allowed antenna configuration and selecting the best antenna configuration.

29. A method as recited in claim 27, wherein the receive or transmit chains are connected to the selected antennas through an electronic switch.

* * * * *